(12) United States Patent
Maruoka et al.

(10) Patent No.: US 7,152,646 B2
(45) Date of Patent: Dec. 26, 2006

(54) HEAVY DUTY TIRE

(75) Inventors: Kiyoto Maruoka, Kobe (JP); Minoru Nishi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/912,165

(22) Filed: Aug. 6, 2004

(65) Prior Publication Data
US 2005/0081976 A1    Apr. 21, 2005

(30) Foreign Application Priority Data

Oct. 7, 2003    (JP)    ............................ P2003-348570
Dec. 3, 2003    (JP)    ............................ P2003-404829

(51) Int. Cl.
*B60C 15/06*    (2006.01)
*B60C 15/00*    (2006.01)

(52) U.S. Cl. ...................... 152/543; 152/546; 152/547; 152/552

(58) Field of Classification Search ................ 152/543, 152/552, 547, 546
See application file for complete search history.

(56) References Cited

U.S. PATENT DOCUMENTS

| | | | |
|---|---|---|---|
| 4,155,394 A * | 5/1979 | Shepherd et al. ........ | 152/543 X |
| 6,467,520 B1 * | 10/2002 | Duddey | |
| 6,491,079 B1 * | 12/2002 | Kato et al. .................. | 152/543 |
| 6,530,411 B1 * | 3/2003 | Tsukagoshi et al. ......... | 152/552 |
| 6,802,351 B1 * | 10/2004 | Kimura et al. .......... | 152/552 X |
| 2002/0091184 A1 * | 7/2002 | Ikeda | |
| 2004/0194864 A1 * | 10/2004 | Saeki ...................... | 152/552 X |
| 2005/0006018 A1 * | 1/2005 | Maruoka et al. ........ | 152/552 X |

FOREIGN PATENT DOCUMENTS

| | | | | |
|---|---|---|---|---|
| EP | 1 066 992 A2 | * | 1/2001 | |
| JP | 64036509 A | * | 2/1989 | |
| JP | 04266507 A | * | 9/1992 | |
| JP | 10-309911 A | | 11/1998 | |
| JP | 11-321244 A | | 11/1999 | |
| JP | 2000-219016 A | | 8/2000 | |
| JP | 2001191746 A | * | 7/2001 | |
| JP | 2001191748 A | * | 7/2001 | |
| JP | 2001191749 A | * | 7/2001 | |
| JP | 2001191754 A | * | 7/2001 | |
| JP | 2001191756 A | * | 7/2001 | |

(Continued)

*Primary Examiner*—Adrienne C. Johnstone
(74) *Attorney, Agent, or Firm*—Birch, Stewart, Kolasch & Birch, LLP

(57) ABSTRACT

The present invention relates to a heavy duty tire comprising a carcass comprising a carcass ply of cords extending between bead portions and turned up around a bead core in each bead portion from the inside to outside of the tire so as to form a pair of turnup portions and a main portion therebetween, and a bead reinforcing layer comprising at least one reinforcing ply of cords disposed of each said bead portion, wherein
  the turnup portion comprises a turnup main part extending an inner region inside a extension line obtained by extending a radially outer surface of the bead core, and a turnup sub part extending an outer region outside said extension line through a portion near the radially outer surface of said bead core, and wherein
  the reinforcing cord ply comprises a center portion extending along the radially inside the turnup main part, an axially outside portion extending from the center portion to the radially outside of the tire apart from said turnup portion, and an axially inside portion extending from the center portion to the radially outside of the tire through the inside of said main portion.

14 Claims, 12 Drawing Sheets

FOREIGN PATENT DOCUMENTS

| | | | |
|---|---|---|---|
| JP | 2001191761 A | * | 7/2001 |
| JP | 2001191763 A | * | 7/2001 |
| JP | 2001233013 A | * | 8/2001 |
| JP | 2002-67628 A | | 3/2002 |
| WO | WO-02/102612 A1 | * | 12/2002 |

* cited by examiner

HEAVY DUTY TIRE

This Nonprovisional application claims priority under 35 U.S.C. § 119(a) on Patent Application No(s). 2003-348570 and 2003-404829 filed in Japan on Oct. 7, 2003 and Dec. 3, 2003; respectively, the entire contents of which are hereby incorporated by reference.

BACKGROUND OF THE INVENTION

1. Field of the Invention

The present invention relates to a heavy duty tire which can improve a durability of a bead portion.

2. Description of the Prior Art

In FIGS. 12A and 12B, there is shown a structure of a bead portion of a conventional heavy duty tire. The bead portion shown in FIG. 12A is structured such that a turnup portion "a" of a carcass ply is wound around a bead core b. The turnup portion a includes an end portion a1 extending along a radially outer surface bs of the bead core b. The end portion a1 is held between the bead core b and a bead apex c. Further, the bead portion shown in FIG. 12B has the turnup portion "a" of the carcass ply wound around the bead core b, however, a rubber g having a substantially constant thickness is arranged between the end portion a1 and the bead core b.

As in the above example, the bead portion having the turnup portion a wound around the bead core b is also called as a "bead wind structure". In the bead wind structure, since an outer end of the turnup portion "a" is positioned near the radially outer surface of the bead core b, a stress applied to the end portion a1 of the turnup portion "a" at a time when a tire is deformed is small. Accordingly, it is possible to prevent damage such as a loose from the end portion a1 or the like. Further, since a length of the turnup portion a is short, the tire can be lightened. However, the bead wind structure has a defect that a loose of a carcass cord at an innermost end position Q in a tire axial direction of the bead core b tends to be generated, which has not been conventionally seen frequently.

DISCLOSURE OF THE INVENTION

The present invention is made by taking the problems mentioned above into consideration, and an object of the present invention is to provide a heavy duty tire which can improve a durability of a bead portion without damaging an advantage provided in a bead wind structure.

In accordance with the present invention, there is provided a heavy duty tire comprising a carcass comprising a carcass ply of cords extending between bead portions and turned up around a bead core in each bead portion from the inside to outside of the tire so as to form a pair of turnup portions and a main portion therebetween, and a bead reinforcing layer comprising at least one reinforcing ply of cords disposed of each said bead portion, wherein the turnup portion comprises a turnup main part extending an inner region inside a extension line obtained by extending a radially outer surface of the bead core, and a turnup sub part extending an outer region outside said extension line through a portion near the radially outer surface of said bead core, and wherein the reinforcing ply comprises a center portion extending along the radially inside surface the turnup main part, an axially outside portion extending from the center portion to the radially outside of the tire apart from said turnup portion, and an axially inside portion extending from the center portion to the radially outside of the tire through the inside of said main portion.

It is preferable that in a state of 5% internal pressure when the tire is mounted on a standard rim and inflated by 5% of a standard pressure but loaded with no tire load, the distance La between an outer end of the turnup sub part and the radially outer surface of said bead core is not more than 15 mm. Alternately, it is desirable that the angle θ between said turnup sub part and said radially outer surface of said bead core is not more than 75 degrees in the 5% internal pressure state. Further, it is preferable that the turnup sub part has a gap Lb between the outer end of said turnup sub part and said main portion is 1 to 10 mm under the 5% internal pressure state. Further, it is desirable that a rubber thickness t between the bead core and the carcass cord is 0.5 to 3.0 mm, at an innermost position in the tire axial direction of the bead core, under the 5% internal pressure state.

Further, with respect to the reinforcing cord ply, it is desirable that each of heights Hb and Hc in the tire radial direction from a bead base line of the inside portion and the outside portion is more than 20 mm and not more than 40 mm. In this case, it is desirable that the height Hc is more than the height Hb. Further, it is desirable that a packing rubber having a complex modulus Ea* with 2 to 25 MPa is arranged in at least a part between the carcass ply and the bead core.

Further, in a state of standard internal pressure when the tire is mounted on a standard rim and inflated by a standard pressure but loaded with no tire load, it is desirable that the outer end of the turnup sub part is positioned at an inner side of a reference line intersecting vertically with the main portion through a point at which the outer surface of the bead portion is apart from the flange of the standard rim. In this case, it is desirable that a shortest distance Lp between the outer end of the turnup sub part and the reference line is 2 to 12 mm. Further, in the above state, it is desirable that the outer end of the outside portion of the reinforcing ply is positioned at an area which is within 5 mm inward from the reference line and within 20 mm outward therefrom. In the same manner, it is desirable that the outer end of the inside portion of the reinforcing ply is positioned in an area which is within 30 mm outward from the reference line.

Further, in a standard load applying state when the tire is mounted on a standard rim and inflated by a standard pressure and loaded with a standard load, it is desirable that the angle θ between the turnup sub part and the radially outer surface of the bead core is less than 90 degrees. Further, in above state, it is desirable that the outer end of the turnup sub part is positioned inside the reference line. In this case, the shortest distance Lp between the outer end of the turnup sub part and the reference line is 10 to 25 mm.

Further, in the above state, it is desirable that the outer end of the outside portion of the reinforcing ply is positioned at an area within 10 mm inward from the reference line and within 15 mm outward therefrom. In the same manner, it is desirable that the outer end of the inside portion of the reinforcing ply is positioned at an area which is within 10 mm inward from the reference line and within 20 mm outward therefrom.

The tire shape in the 5% internal pressure state approximately coincides with the tire shape within the vulcanizing mold, normally.

Further, the terms used in this specification, namely: "standard rim", "standard pressure", "standard load" and "bead base line" are defined as follows:

Standard rim is the "standard rim" specified in JATMA, the "Measuring Rim" in ETRTO, the "Design Rim" in TRA or the like;

Standard pressure is "maximum air pressure" in JATMA, the "Inflation Pressure" in ETRTO, the maximum pressure given in the "Tire Load Limits at Various Cold Inflation Pressures" table in TRA or the like;

Standard load is the "maximum load capacity" in JATMA, the "Load Capacity" in ETRTO, the maximum value given in the above-mentioned table in TRA or the like; and Bead base line is an axial line passing the bead heel point at the axially outer end of the bead bottom and corresponding to the rim diameter.

DETAILED DESCRIPTION OF THE INVENTION

A description will be given of an embodiment in accordance with the present invention with reference to the accompanying drawings.

Figure 1:
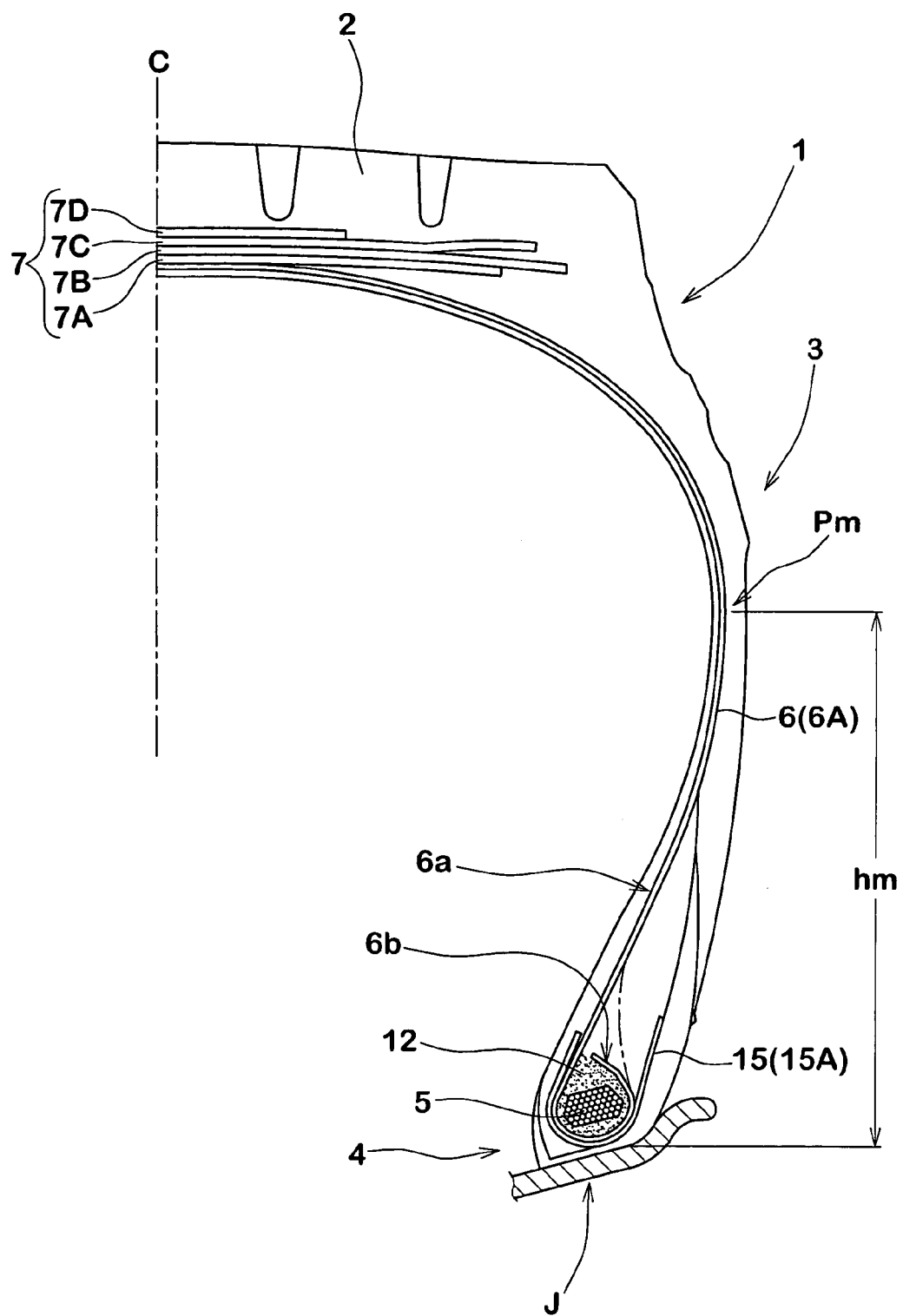
FIG. 1 is a cross sectional view of a 5% internal pressure state showing an embodiment of a heavy duty tire in accordance with the present invention.

FIG. 1 is a cross sectional view of a right half portion in a 5% internal pressure state of a heavy duty tire in accordance with the present invention. The tire 1 comprises a tread portion 2, a pair of side wall portions 3, a pair of bead portions 4 with a bead core 5 therein, a carcass 6 extending between the bead portions 4, a belt 7 disposed radially outside the carcass in the tread portion 2, and a bead reinforcing layer 15 comprising at least one reinforcing ply 15A of cords arranged in each bead portion 4.

The belt 7 comprises at least two, preferably three or more belt plies of parallel cords laid at an angle of 10 to 40 degrees with respect to the tire equator C. The belt 7 shown in FIG. 1 comprises four belt plies 7A, 7B, 7C and 7D, and at least two belt plies are arranged at the direction each belt cords intersect. As the belt cord, a high elastic cord such as the steel cord is desirable.

The carcass 6 comprises one carcass ply 6A of steel cords arranged radially at an angle of 70 to 90 degrees with respect to the tire equator C, and extending between the bead portions 4 through the tread portion 2 and the sidewall portions 3, and turned up around the bead cores 5 from the axially inside to outside of the tire, so as to form a pair of turnup portions 6B and a main portion 6A there between. For the carcass cord, steel cords are preferably used, but organic fiber cord such as a nylon, a rayon, a polyester, an aromatic polyamide and the like can be used.

Figure 2:
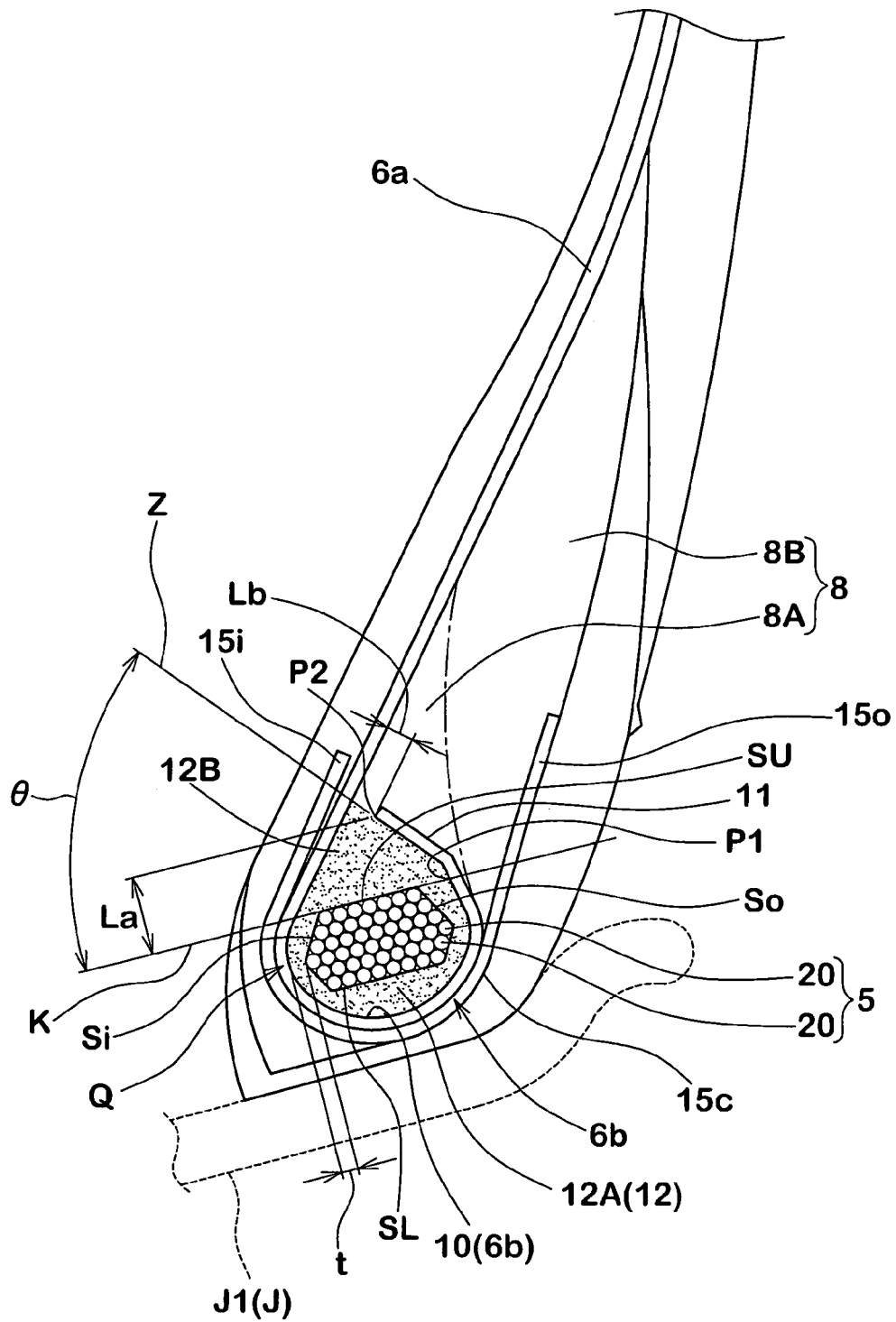
FIG. 2 is an enlarged cross sectional view of the bead; portion thereof.

The bead core 5 is formed by winding a bead wire 20 predetermined times in a long sideways hexagonal cross sectional shape as shown in FIG. 2. The cross sectional shape of the bead core 5 has a radially inner surface SL and radially outer surface SU which are inclined at 10 to 17 degrees, in this example almost 15 degrees with respect to the axial direction which corresponds to the inclination of the tapered bead seat J1 of the standard rim J. Further, the inner surface SL and the outer surface SU are connected in an axially inner surface Si and an axially outer surface So which are bent in an approximately center portion. The cross sectional shape of the bead core 5 may be a regular hexagonal shape, a rectangular shape or a circular shape as occasion demands.

The turnup portion 6b comprises a turnup main part 10, extending an inner region inside a extension line K obtained by extending a radially outer surface SU of the bead core 5, and a turnup sub part 11 extending an outer region outside said extension line K through a portion near the radially outer surface SU of said bead core 5. The turnup main part 10 is smoothly curved along the axially inner surface Si, the radially inner surface SL and the axially outer surface So of the bead core 5. The turnup sub part 11 is connected to the turnup main part 10, and extends toward the main portion 6a through a portion near the outer surface SU of the bead core 5. Further, a bead apex 8 is disposed in each bead portion 4. The apex 8 extends radially outwardly from the turnup sub part 11 and tapers radially outwardly. Accordingly, at least a part of the turnup sub part 11 exists between the bead core 5 and the bead apex 8.

As a preferable aspect, in the state of 5% internal pressure, the turnup portion 11 is structured such that the distance La between the outer end P2 of the turnup sub part 11 and the radially outer surface SU of the bead core 5 is not more than 15 mm, more preferably not more than 10 mm, and further preferably not more than 8 mm. Accordingly, a stress applied to the outer end P2 of the turnup sub part 11 can be effectually reduced. Therefore, it is possible to effectively prevent damage being generated from the outer end P2. Further, a weight saving of the tire can be simultaneously achieved. The turnup sub part 11 sown in FIGS. 1 and 2 is not in contact with the radially outer surface SU of the bead core 5, however, may be in contact with the outer surface SU (not shown).

The turnup sub part 11 in accordance with the present embodiment is shown as a structure which is gradually apart from the radially outer surface SU of the bead core 5 toward the outer end P2. The angle θ between the turnup sub part 11 and the outer surface SU of the bead core 5 is preferably not more than 75 degrees, more preferably not more than 70 degrees, and further preferably not more than 60 degrees. Further, the turnup portion 11 may be formed in a linear shape in a tire cross section, or may be bent as shown in the present embodiment.

Figure 3:
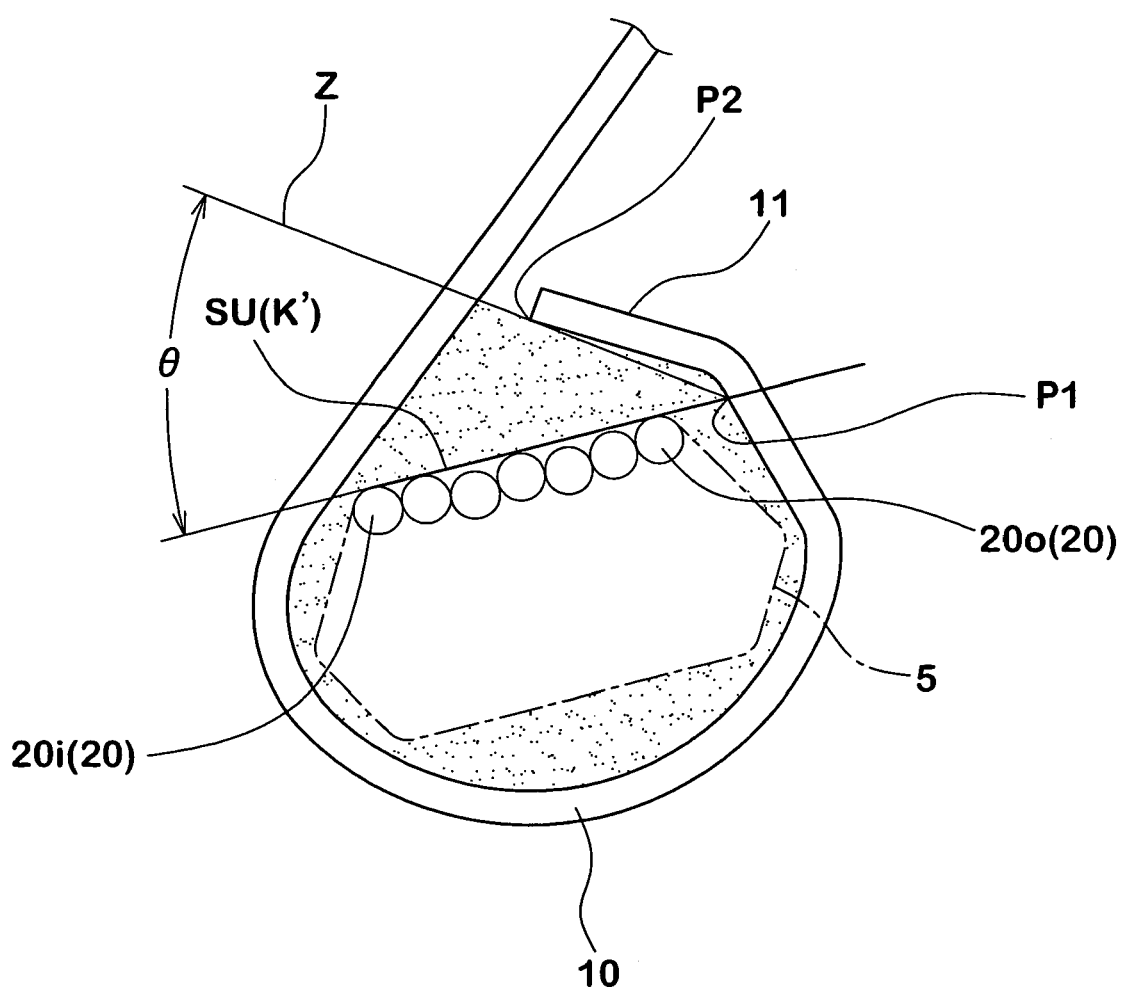
FIG. 3 is an enlarged cross sectional view around the bead core thereof.

As shown in FIG. 3, there is a case that no common tangential line is drawn in the bead wire 20 constituting the outer surface SU of the bead core 5. In the case mentioned above, the angle θ is defined as an angle with respect to a vertial tangential line K' which is in contact with a bead wire 20o positioned at an outermost side in the tire axial direction and a bead wire 20i positioned at an innermost side in bead wires constituting the outer surface SU. Further, the term "linear" includes a circular arc having a radius of curvature not less than 100 mm as well as a complete linear line. This is because of allowing the carcass ply to deform at a time of vulcanization.

In the case that the turnup sub part 11 is formed by the circular arc, the angle θ is set to an angle formed between the outer surface SU of the bead core 5 and a straight line Z obtained by connecting an intersecting point P1 where the extension line K of the outer surface SU of the bead core 5 intersects with the turnup sub part 11 and the outer end P2 thereof. In the above case, the radius of curvature of turnup sub part 11 is set to a radius of curvature of a circular arc passing through three points comprising the intersecting point P1, the outer end P2 and the intermediate point. Further, in the case that the turnup subpart 11 is bent, the angle θ of each of the portions with respect to the outer surface SU is preferably not more than 75 degrees.

Further, it is desirable that a gap Lb between the outer end P2 of the turnup sub part 11 and the main portion 6a is 1 to 10 mm. The gap Lb corresponds to a rubber thickness between the carcass cords. In the case that the gap is less than 1 mm, the outer end P2 of the turnup sub part 11 and the carcass cord of the main portion 6a are in contact and in friction due to a deformation during running or the like, and a fretting wear tends to be generated. On the contrary, if the gap Lb is more than 10 mm, there tends to be generated a blow-by phenomenon that the turnup sub part 11 is drawn into the main portion 6a during running. The gap Lb is particularly preferably 1 to 5 mm, and further preferably 2 to 4 mm.

In the tire having the bead wind structure, as mentioned above, the damage such as the loose tends to be generated in the carcass cord, at an innermost position Q in the tire axial direction of the bead core 5. The inventors have carried on various researches with regard to this point, and have found the following causes. First, in the bead wind structure, the carcass ply 6A tends to collapse onto the outer side in the tire axial direction comparatively largely, and secondly, heat (reaching to some hundreds degrees) of the brake pad or the like tends to be transferred to the rubber within the bead portion 4 via the rim J. It has been found that the rubber within the bead portion tends to be softened in the tire having the bead wind structure, on the basis of synergetic effect. Further, as shown by an arrow F in FIG. 4, the rubber within the softened bead portion 4a tends to be compressed by the flange of the rim J and move to the bead toe side. It is presumed that the movement of the rubber mentioned above moves the turnup portion 6b, generates a large shear strain between the carcass ply 6A and the bead core 5 at the position Q, and induces the cord loose.

Figure 4:
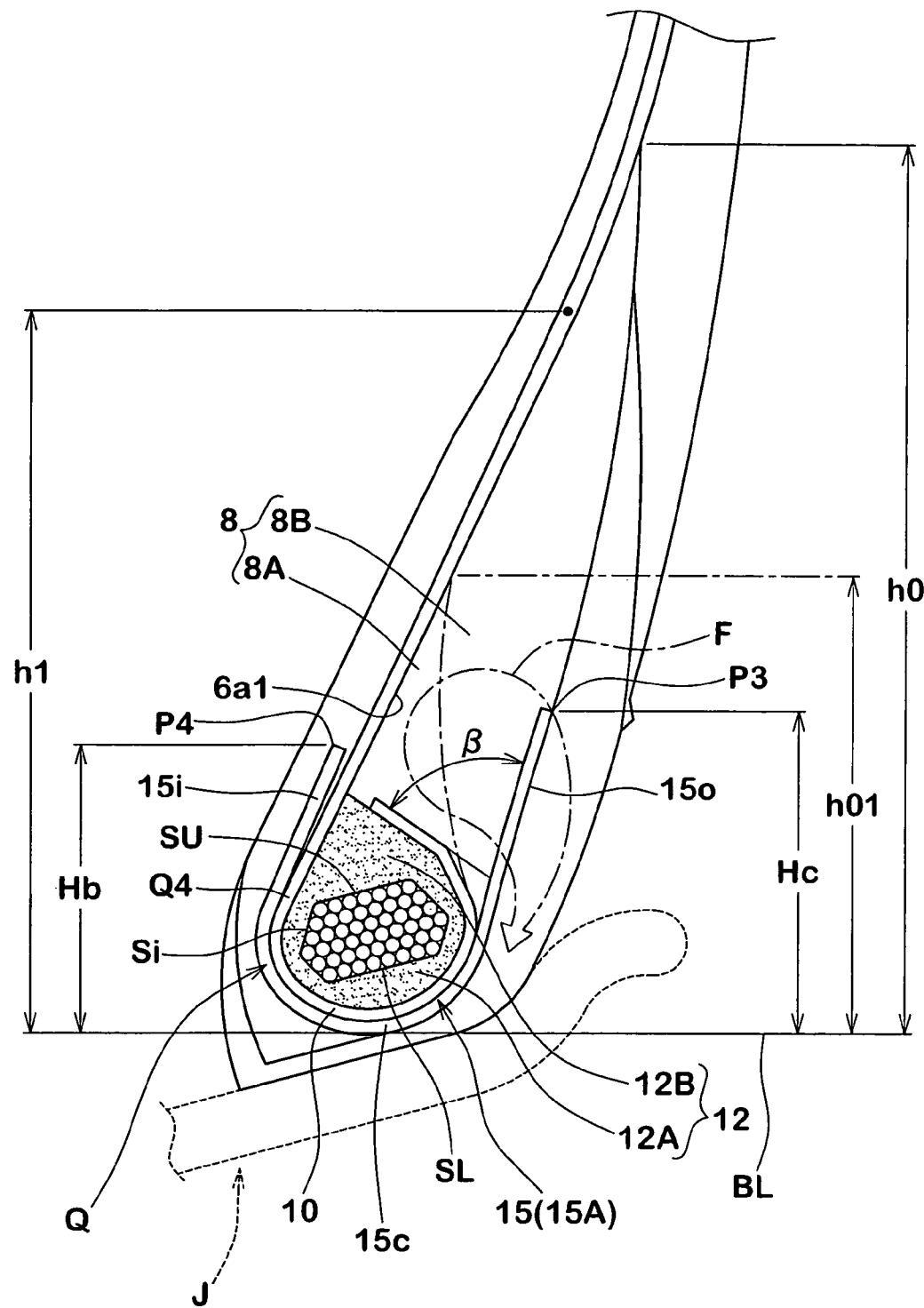
FIG. 4 is an enlarged cross sectional view of the bead portion in FIG. 1.

In accordance with the present invention, in order to control the damage mentioned above, the bead portion 4 is provided with a bead reinforcing layer 15 comprising at least one reinforcing ply 15A of cords. The bead reinforcing layer 15 in accordance with the present embodiment comprises one reinforcing ply 15A as shown in FIG. 4. In this embodiment, the reinforcing ply 15A made of steel cords inclined at an angle, for example, 10 to 40 degrees with respect to a tire circumferential direction. Further, the reinforcing ply 15A comprises a center portion 15c, an axially outside portion 15O and an axially inside portion. The center portion 15c is curved along the turnup main part 10 and extends along an radially inside thereof. The outside portion 15o extends to radially outside from the center portion 15c and apart from the turnup part 10. The side portion 15i extends to an radially outside along an inner side of the main portion 6a.

In this example, the outside portion 15o extends along the axially outer surface of the bead apex 8. Accordingly, the outside portion 15o prevents the softened rubber from moving to the bead toe side. In preferable, the angle β between the turnup sub part 11 and the outside portion 15o is 45 to 90 degrees, and more preferably 60 and 90 degrees. Further, the inside portion 15i of the bead reinforcing layer 15 reinforces the main portion 6a by being substantially overlapped along the main portion 6a so as to extend. Accordingly, it is possible to make the collapse of the carcass ply 6A during running with load small. The movement of the softened rubber is controlled by an interaction therebetween, and the shear strain between the carcass ply 6A and the bead core 5 at the position Q can be reduced.

As a particularly preferable aspect, the heights Hc and Hb of the outside portion 15o and the inside portion 15i of the bead reinforcing layer 15 in the radial direction from the bead base line BL are both more than 20 mm and not more than 40 mm. In the case that each of the heights Hb and Hc is not more than 20 mm, or more than 40 mm, the effect of reducing the shear strain at the position Q tends to be lowered.

The height Hc of the outside portion 15o and the height Hb of the inside portion 15i may be equal to each other, however, a relation Hb<Hc is desirable. However, if the difference in height (Hc−Hb) is too large, there is a tendency that a stress is concentrated to the outer end P3 of the outside portion 15o. Accordingly, it is desirable that the difference (Hc−Hb) is more than 0 and not more than 10 mm.

Figure 5:
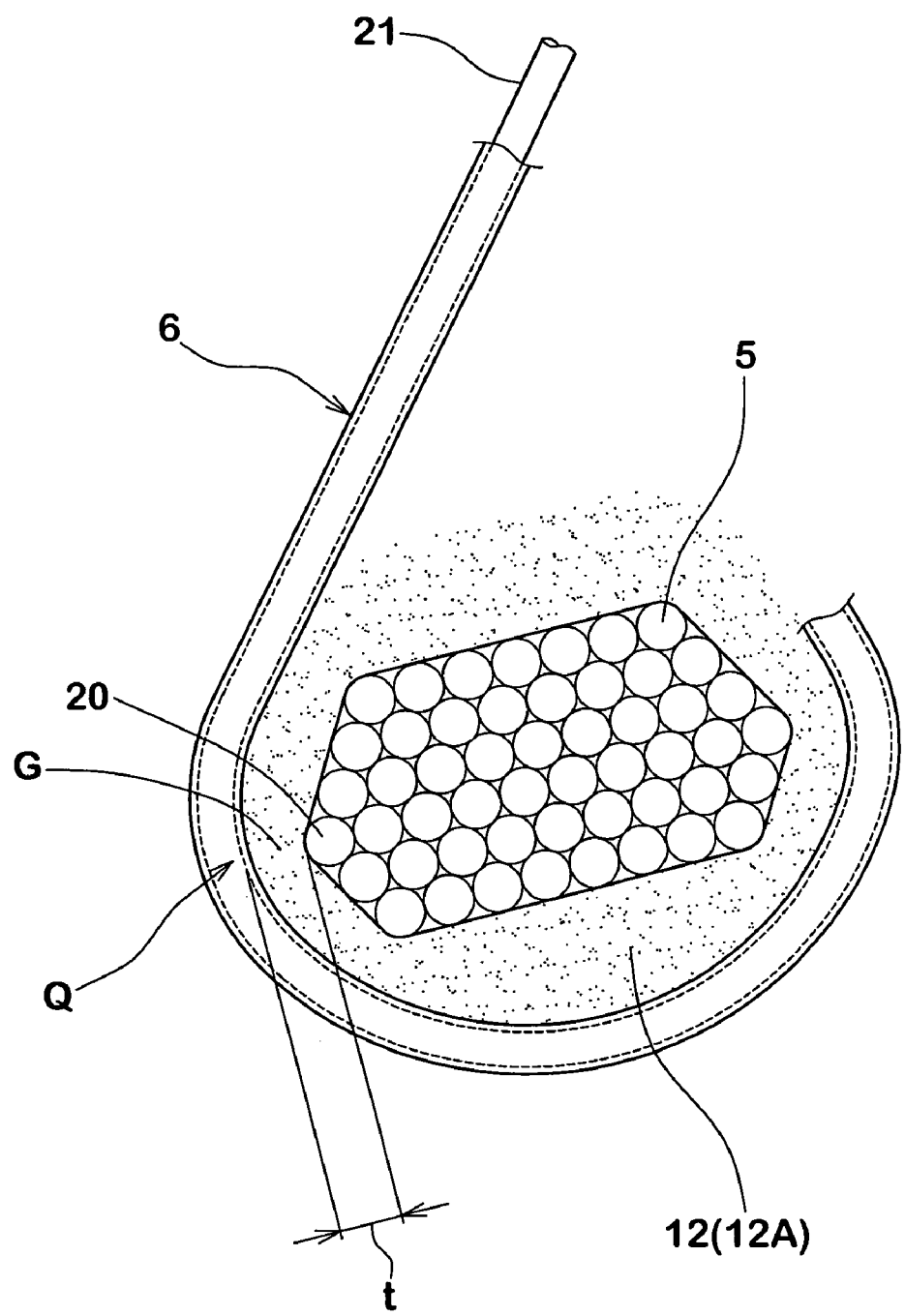
FIG. 5 is an enlarged view showing the rubber thickness between a bead core and a carcass cord.

As shown in FIG. 5, at the position Q mentioned above, it is desirable that a thickness t between the bead core 5 and the carcass cord 21 is 0.5 to 3.0 mm. Accordingly, at the position Q, the shear stress is absorbed by an elastic deformation of the rubber G. In the case that the thickness t of the rubber G is less than 0.5 mm, the effect of absorbing the shear stress is relatively reduced, and on the contrary, in the case that it is more than 3.0 mm, a blow-by phenomenon tends to be generated in the turnup portion 6b. The thickness t of the rubber G is more preferably 1.2 to 3.0 mm, further preferably 1.5 to 3.0 mm, and particularly preferably 2.0 to 3.0 mm.

A packing rubber 12 is arranged in at least a part between the carcass ply 6A and the bead core 5. In the present embodiment, the packing rubber 12 comprises a base portion 12A and a sub portion 12B. The base portion 12A corresponds to a U-shaped cross sectional portion filled around the surface Si, SL and So of the bead core 5 The sub portion 12B corresponds to an approximate triangular cross sectional portion filled among the radially outer surface SU of the bead core 5, the turnup sub part 11 and the main portion 6a.

The sub portion 12B prevents a defective molding, for example, an air is left between the turnup sub part 11 which is going to spring back, and the bead core 5 in a green tire molding process or the like. Further, the sub portion 12B prevents the friction between the outer surface SU of the bead core 5 and the carcass cord, and serves for controlling the fretting. In order to obtain the sub portion 12B mentioned above, the distance La is not less than 3 mm, more preferably not less than 5 mm, and further preferably not less than 6 mm.

Further, the packing rubber 12 has a complex modulus Ea* of 2 to 25 MPa, preferably. Accordingly, the packing rubber 12 absorbs the vibration and the stress applied to the outer end P2 of the turnup sub part 11, and improves a durability of the bead portion 4. When the complex modulus Ea* of the packing rubber 12 is more than 25 MPa, a flexibility is deteriorated, and a cord loose tends to be generated in the outer end P2 of the turnup sub part 11. On the other hand, in the case that it is less than 2 MPa, the packing rubber 12 is too soft and the turnup portion 6b tends to be drawn by the movement of the rubber. The packing rubber 12 has the complex modulus Ea* which is preferably more than 3 MPa, further preferably more than 13 MPa. In this case, the value of the complex modulus corresponds to a value which is measured by using a viscoelastic spectrometer under a condition of a temperature of 70° C., a frequency of 10 Hz and a dynamic strain rate of 2%.

Further, the packing rubber 12 is preferably constituted by a rubber in which a sulfur serving as a vulcanizing agent is blended at 5.0 PHR or more. The rubber which is hard to be heat softened can be used by blending the sulfur at 5.0 PHR or more. Accordingly, in the case that the temperature of the bead portion is increased due to heat of a brake pad or the like, the packing rubber 12 prevents the motion of the turnup portion 6b without being softened.

When the blend amount of the sulfur is more than 12 PHR, a vulcanizing speed is increased of the packing rubber 12, so that a rubber burn tends to be generated. The matter lowers an adhesive property with the adjacent member. On the basis of the viewpoint mentioned above, the blend amount of the sulfur is desirably 5.0 to 12 PHR, further preferably 7.0 to 12 PHR, and further preferably 7.5 to 10 PHR.

Figure 6:
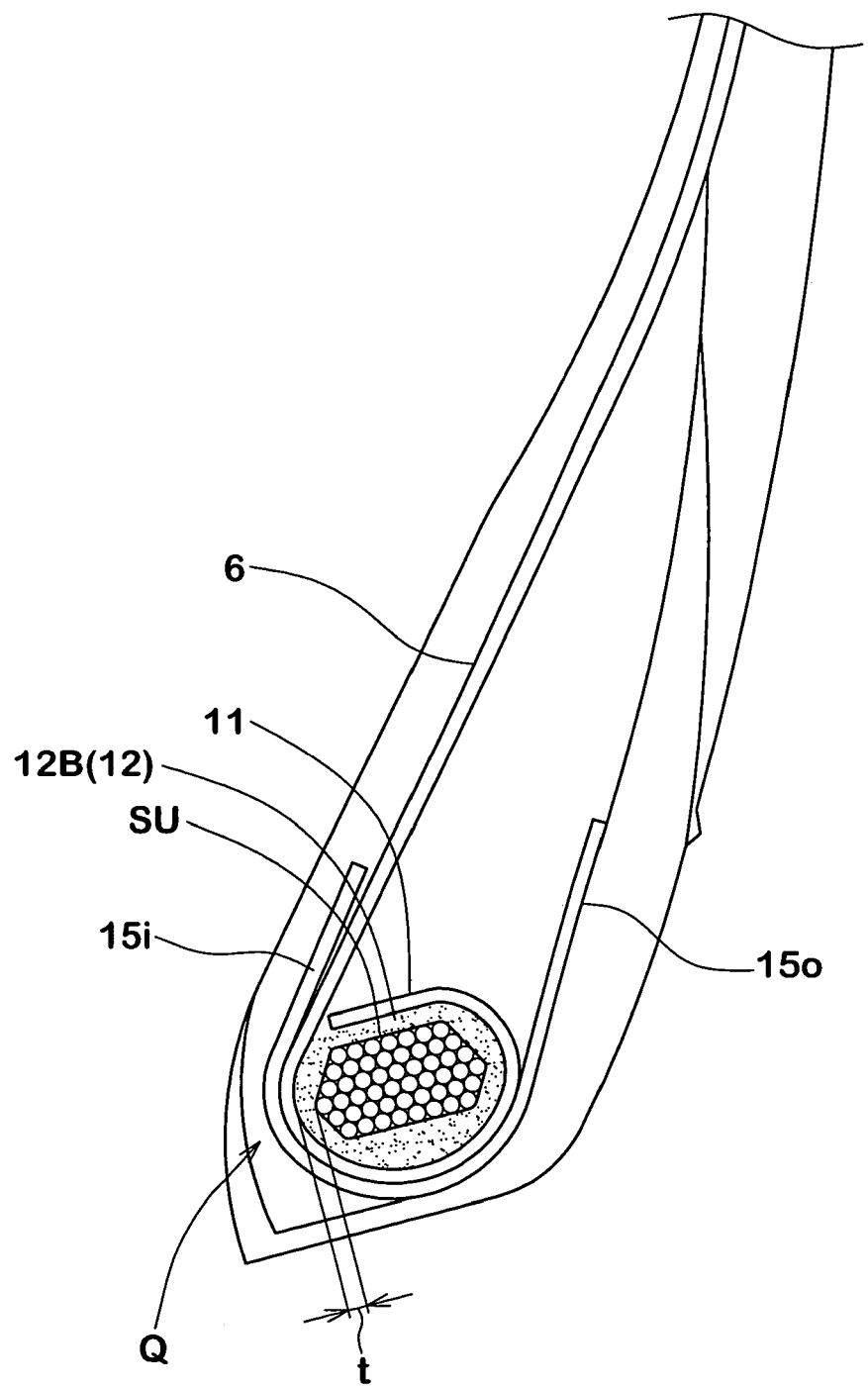
FIG. 6 is a cross sectional view showing another example of a packing rubber.

FIG. 6 shows the other embodiment of the packing rubber 12. In the packing rubber 12 in accordance with the embodiment, a sub portion 12B has a substantially constant thickness. Further, although not shown, the turnup subpart 11 can be brought into contact with the outer surface SU of the bead core 5 by omitting the sub portion 12B of the packing rubber 12.

Further, as shown in FIG. 4, in the heavy duty tire 1 in accordance with the present embodiment, the main portion 6a of the carcass ply 6A includes a linear portion 6a1 extending linearly toward an outer side from an inner end position Q4 in the tire radial direction. The height h1 of the linear portion 6a1 from the bead base line BL is preferably 40 to 50% of the height h0 in the tire radial direction of the bead apex 8. This serves for making the bead portion 4 more slim, reducing the weight, and improving the durability on the basis of reduction in heat reserve generated together therewith.

The bead apex 8 in accordance with the present embodiment comprises an inner apex 8A which is arranged in the inner side in the tire radial direction, and an outer apex 8B which is arranged in an outer side thereof. For example, the inner apex 8A has a complex modulus Eb1* of 35 to 60 MPa, and the outer apex 8B has a complex modulus Eb2* which is smaller than the inner apex 8A. Further, the complex modulus Eb2* of the outer apex 8A is more than the complex modulus Ea* of the packing rubber 12. It is desirable that a height h01 of the inner apex 8A from the bead base line BL is in a range of 40 to 60% the height h0. Accordingly, it is possible to intend to achieve both a ride comfort and a driving stability.

Figure 7:
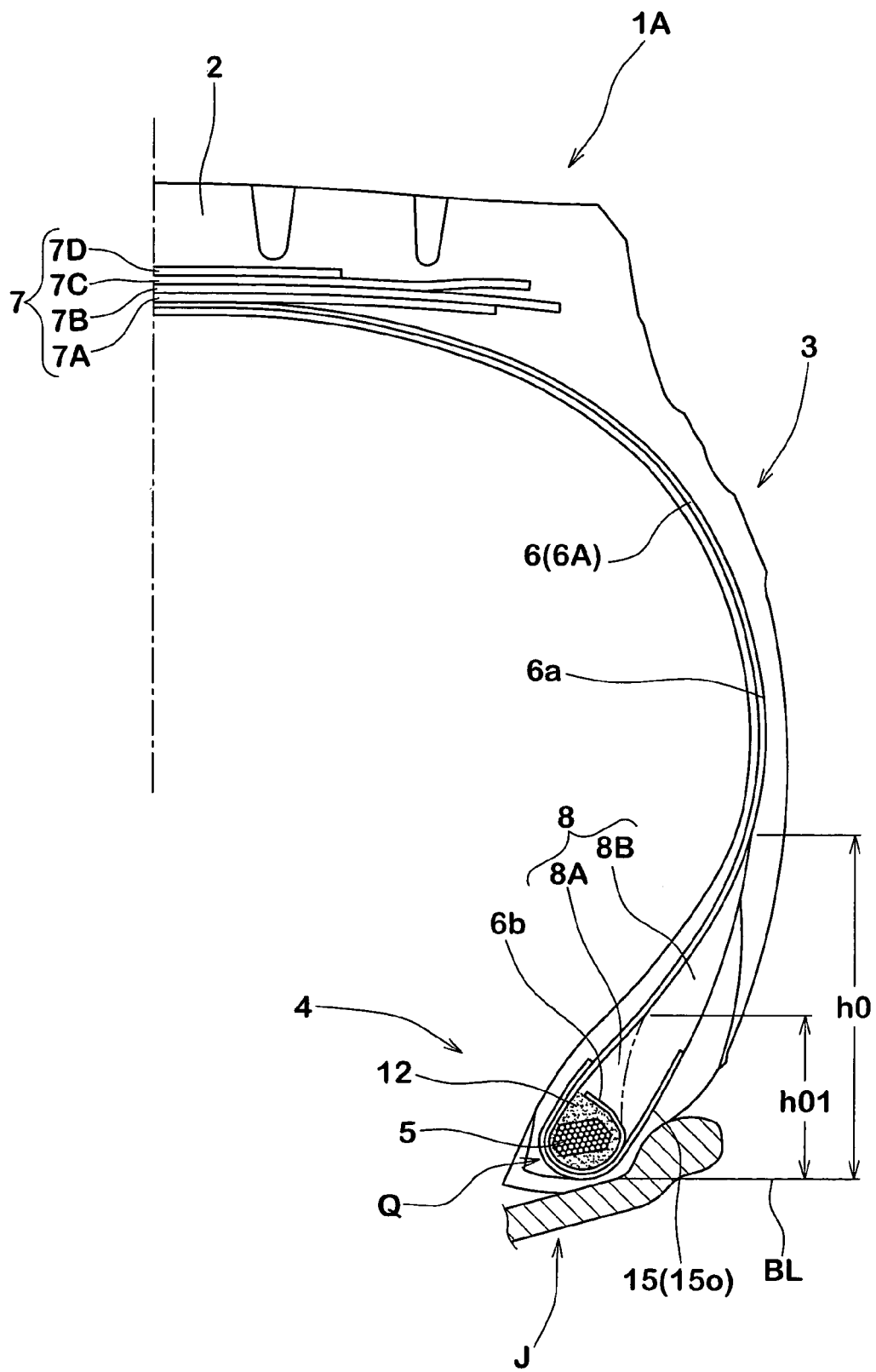
FIG. 7 is a cross sectional view of a heavy duty tire in a standard internal pressure state showing another embodiment in accordance with the present invention.
Figure 8:
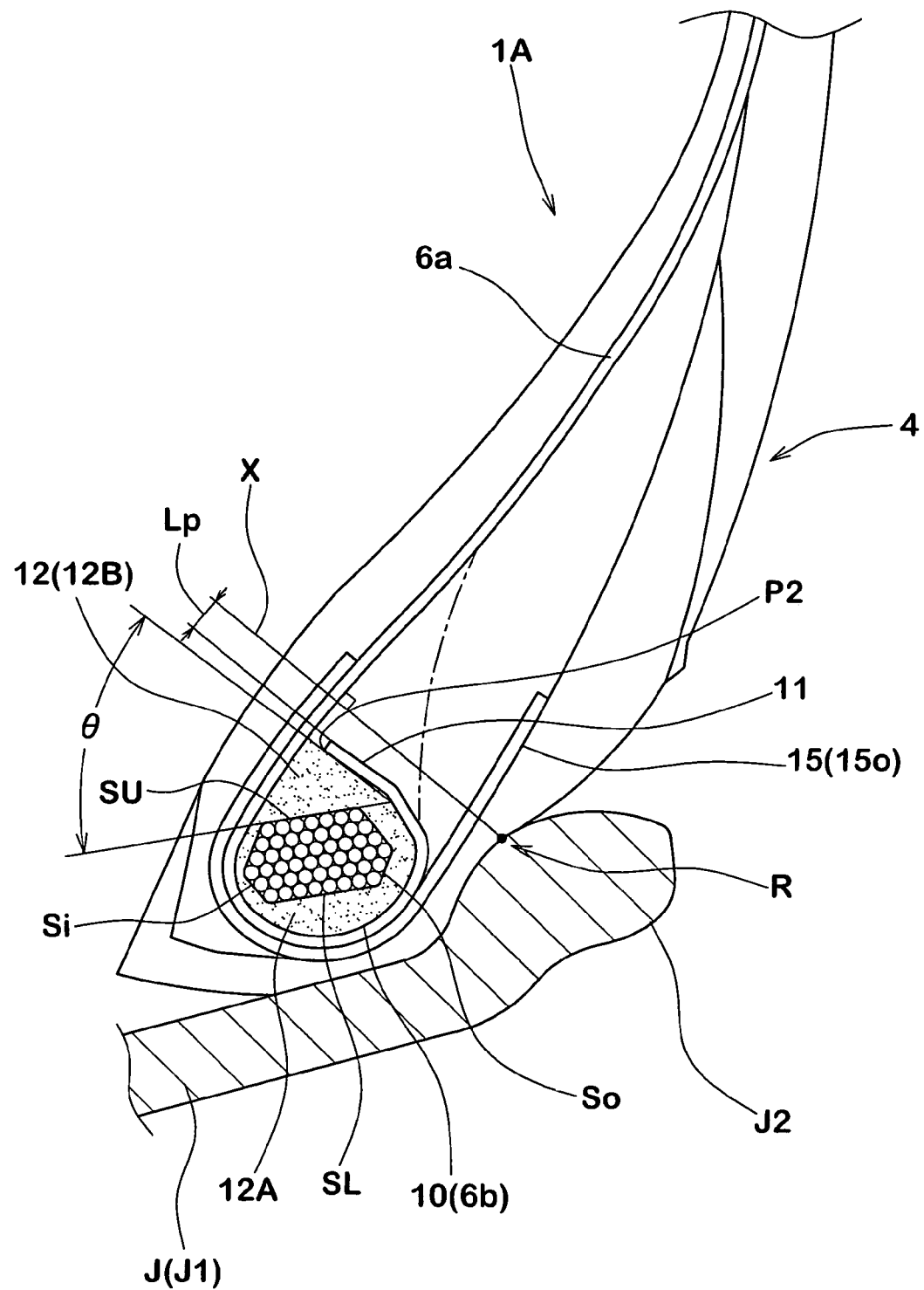
FIG. 8 is an enlarged cross sectional view of the bead portion thereof.

FIG. 7 shows the other embodiment in accordance with the present invention. This view shows the heavy duty tire 1 which is mounted on the standard rim and inflated with the standard pressure but loaded with no tire load. Further, FIG. 8 shows an enlarged view thereof. The outer end P2 of the turnup sub part 11 is positioned inside (close to a bead toe) of a reference line X in which intersects vertically the main portion 6a through a point R at which the outer surface of the bead portion 4 apart from the flange J2 of the standard rim J. Further, the shortest distance Lp between the outer end P2 of the turnup sub part 11 and the reference line X is 2 to 12 mm. In this case, the point R mentioned above is a limit point at which the outer surface of the bead portion 4 is in contact with the flange J2 of the standard rim J until the end.

An inner area of the reference line X corresponds to an area having a little strain because the deformation is restricted by the rim J. It is possible to reduce the stress applied to the outer end P2, by arranging the outer end P2 of the turnup sub part 11 in a portion which is 2 mm or more inside the portion. Accordingly, it is possible to prevent the bead damage such as the cord loose or the like generating from the outer end P2. In this case, when the distance Lp is more than 12 mm, a bending degrees of the turnup sub part 11 is increased and the spring back tends to be generated.

Figure 9:
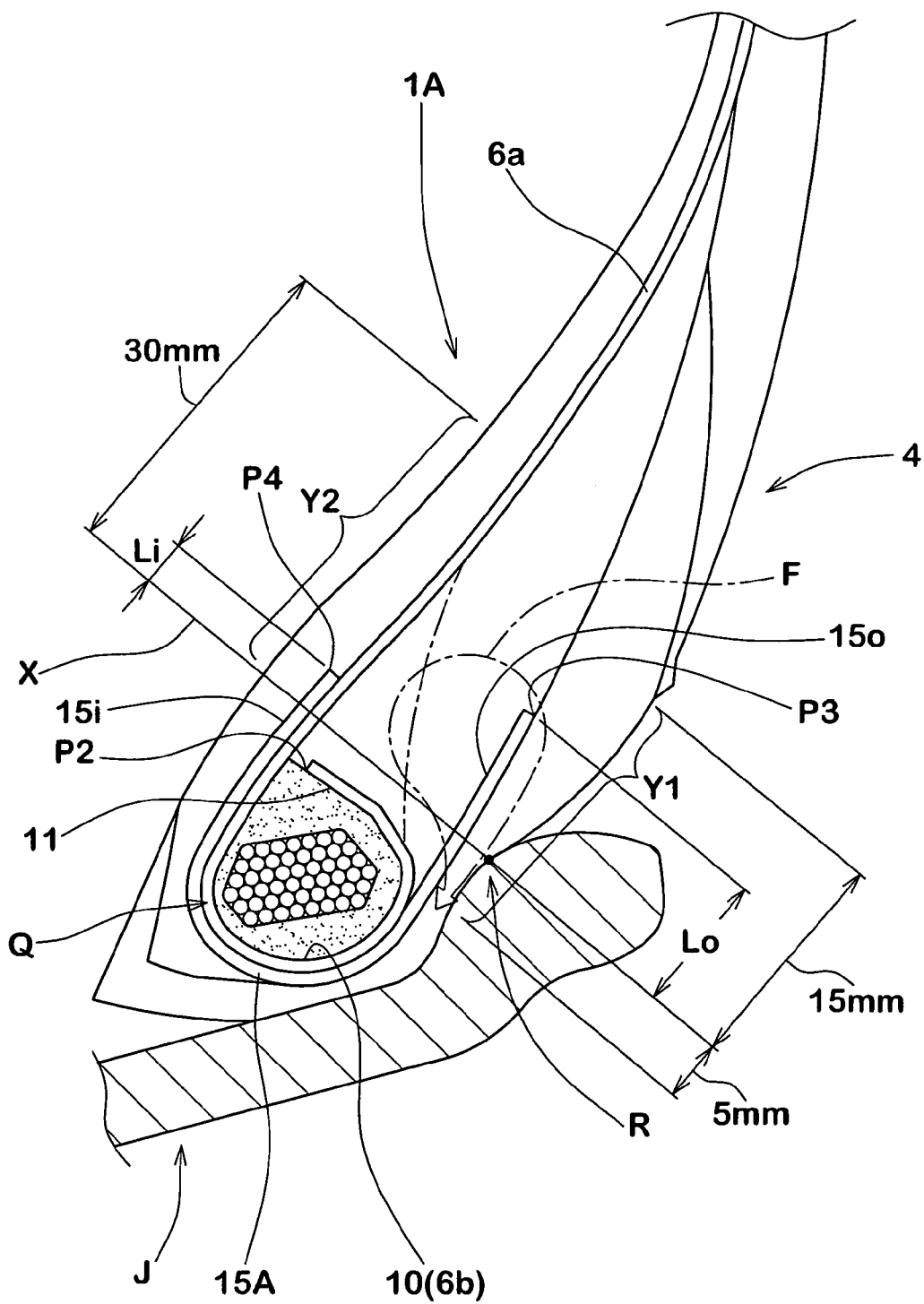
FIG. 9 is an enlarged cross sectional view of the bead portion in FIG. 7.

Further, as shown in FIG. 9, it is desirable that an outer end P3 of the outside portion 15o of the reinforcing ply 15 is positioned in an area Y1 within 5 mm from the reference line X to the inner side and within 20 mm to the outer side therefrom, in a standard internal pressure state. In the same manner, it is desirable that an outer end P4 of the inside portion 15i of the reinforcing ply 15 is positioned in an area Y2 within 0 to 30 mm from the reference line X to the outer side. In other words, on the assumption that the inner side of the reference line X is defined as minus (−) and the outer side is defined as plus (+), it is preferable that a distance Lo between the outer end of the outside portion 15o and the reference line X is −5 mm to +20 mm, and a distance Li between the outer end of the inside portion 15i and the reference line X is 0 to +30 mm, respectively.

The inside portion 15i prevents the carcass ply 6A from collapsing during running with load, and reduces the strain applied to the outer end P2 of the turnup sub part 11. Accordingly, it is preferable that the distance Li is between 0 and +30 mm. If the outer end P4 of the inside portion 15i is positioned inside the reference line X, a reinforcing effect is insufficient and the damage tends to be generated in the outer end P2 of the turnup sub part 11. On the other hand, when the distance Li is more than 30 mm, the strain tends to be concentrated in the outer end P4 of the inside portion 15i.

Further, the outside portion 15o is effective for inhibiting the softened rubber from moving (shown by reference symbol F) and preventing the loose of the carcass cord in the position Q, by setting the distance Lo between −5 mm and +20 mm. In this case, when the distance Lo becomes smaller than −5 mm, an effect of blocking out the moving rubber is lowered, and when the distance Lo is more than +20 mm on the contrary, the damage tends to be generated at the outer end P3 thereof.

Figure 10:
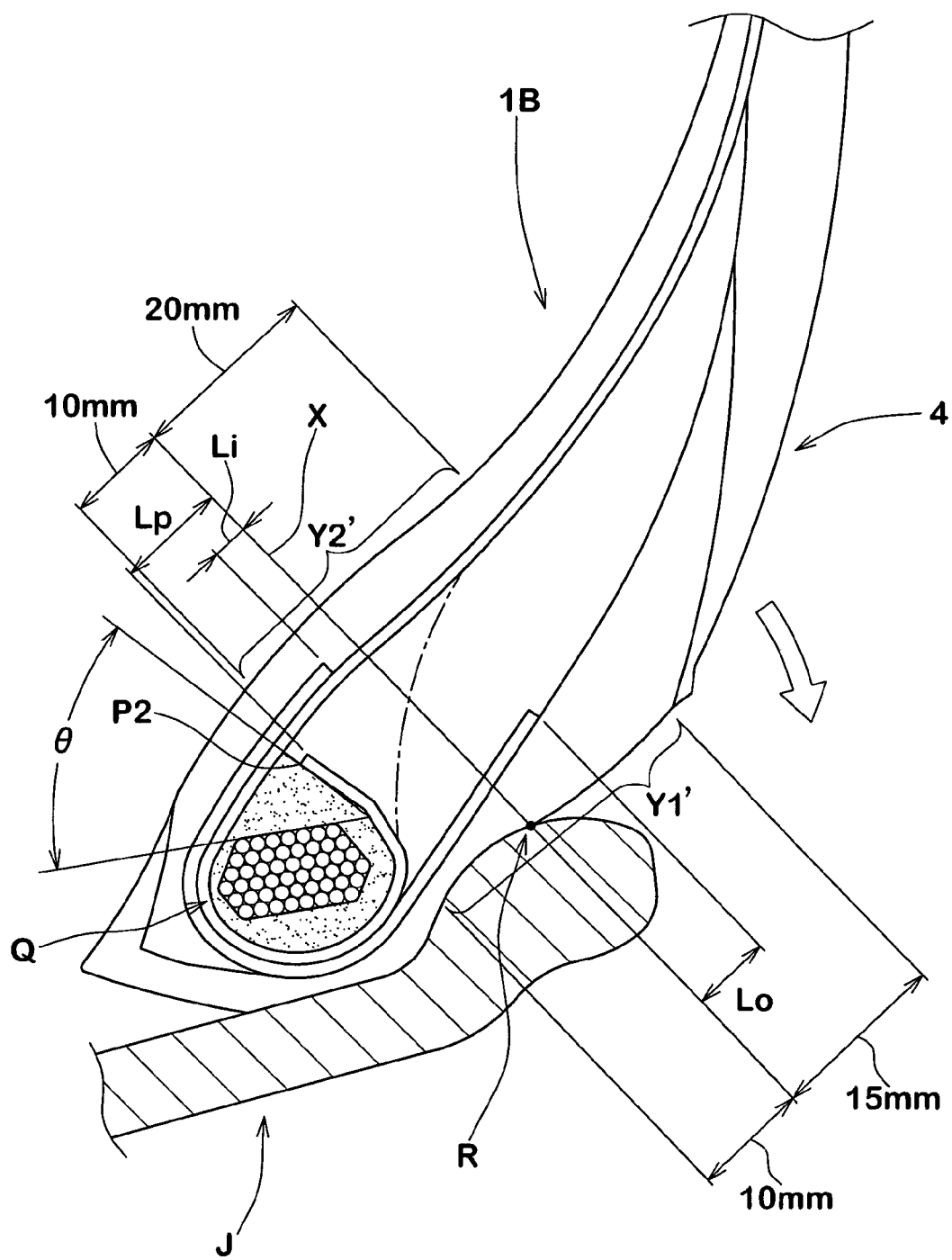
FIG. 10 is a cross sectional view of a heavy duty tire in a standard load applied state showing the other embodiment in accordance with the present invention.

FIG. 10 shows an enlarged view of the bead portion 4 under the standard load applied state in which the tire 1 is mounted on the standard rim J and inflated by the standard pressure and loaded with the standard load, in accordance with the other embodiment of the present invention. The standard load applies state corresponds to a deformed state in which the damage is actually generated in the bead portion 4, and it is effective to define a dimension of each of the portions in this state.

Even under this state, the angle θ between the turnup sub part 11 and the radially outer surface SU of the bead core 5 is not more than 90 degrees, preferably not more than 75 degrees, and further preferably not more than 60 degrees. The outer end P2 of the turnup sub part 11 is positioned in the inner side rather than the reference line X. Further, the shortest distance Lp between the outer end P2 and the reference line X is more than that under the standard internal pressure state. The distance Lp is preferably 10 to 25 mm.

In the standard load applied state, the bead portion 4 collapses to the outer side in the tire axial direction on the basis of the load application. Accordingly, the point R is changed to the outer side in the tire radial direction, and a profile of the main portion 6a is changed, in comparison with the standard internal pressure state. Accordingly, in the standard load applied state, it is desirable that the distance Lp is larger in comparison with the case of the standard internal pressure state. In the case that the distance Lp is less than 10 mm, the stress applied to the outer end P2 of the turnup sub part 11 can not be sufficiently reduced, and when it is more than 25 mm on the contrary, the degrees of bending of the turnup sub part 11 is increased, and the defect molding tends to be generated.

Further, in the standard load applied state, it is desirable that the outer end P3 of the outside portion 15o of the reinforcing ply 15 is positioned in an area Y1' which is within 10 mm from the reference line X to the inner side and within 15 mm to the outer side. In the same manner, it is desirable that an outer end P4 of the inside portion 15i of the reinforcing ply 15 is positioned in an area Y2' which is within 10 mm from the reference line X to the inner side and within 20 mm to the outer side. In the same manner as the case under the standard internal pressure state, in the case that the inner side of the reference line X is defined as minus (−) and the outer side is defined as plus (+), it is desirable that the distance Lo between the outer end P3 of the outside portion 15o and the reference line X is between −10 mm and +15 mm, and the distance Li between the outer end P4 of the in side portion 15i and the reference line X is between −10 mm and +20 mm, respectively.

When the distance Li becomes smaller than −10 mm, there is a tendency that the reinforcing effect by the inner side portion 15i can not be sufficiently obtained, and when it is more than +20 mm on the contrary, the damage tends to be generated by the outer end of the inside portion 15i. Further, when the distance Lo becomes smaller than −10 mm, the blocking effect by the inner piece 15i can not be effectively achieved and the damage tends to be generated at the position Q. When it is more than 15 mm, there is a tendency that the damage tends to be generated at the leading end of the outer portion 15o.

Although not being particularly limited, the heavy load tire 1 satisfying both the conditions for the standard internal pressure state and the standard load applied state is desirable in order to further improve the bead durability.

EMBODIMENT

A radial heavy duty tire of a size 11R22.5 is manufactured by way of trial on the basis of the specification in Tables 1 and 2. Table 1 targets at a tire defining a shape in a 5% internal pressure state, and Table 2 targets at a tire defining a shape in the standard internal pressure state and the standard load state. Further, a bead strength and a bead durability are measured with respect to each of the trial tires.

Figure 11:
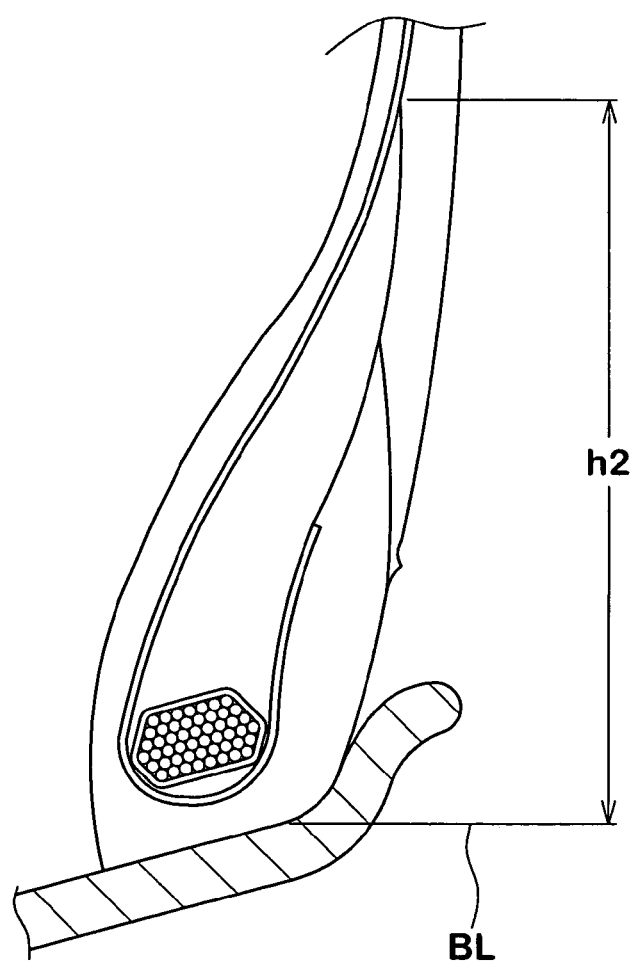
FIG. 11 is a cross sectional view showing a bead portion in accordance with a conventional example.
Figure 12A:
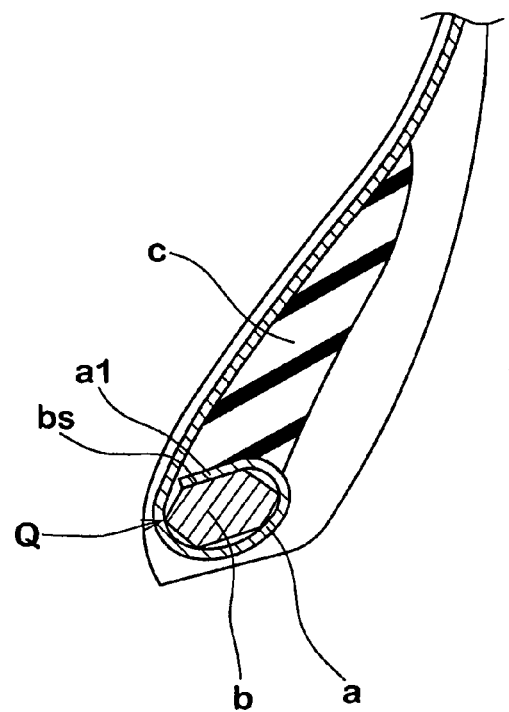
FIGS. 12A and 12B are views each explaining a conventional art of a bead portion.
Figure 12B:
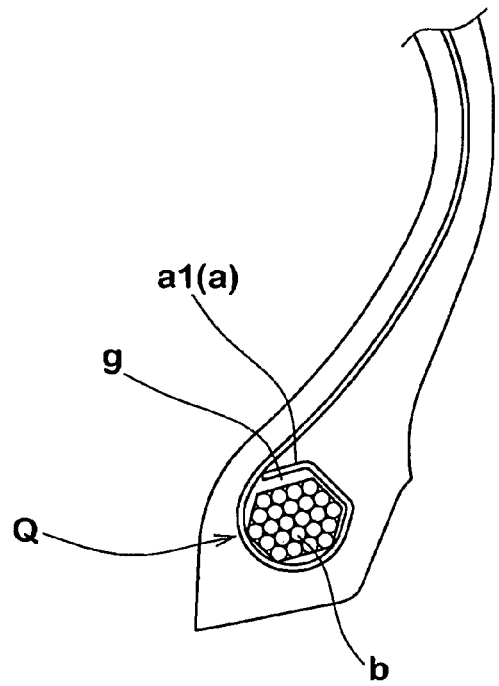

A conventional example employs a general structure in which the turnup portion of the carcass ply is wound up along the outer side surface of the bead apex, as shown in FIG. 11. The height h2 of the turnup portion from the bead base line is set to 65 mm. Further, a testing method is as follows.

<Bead Strength>

The tire is mounted on the rim (7.50×22.5), water is filled in the tire from the tire valve, and a puncture water pressure at a time when the tire is broken is measured and is indicated by an index in the case of setting the conventional example to 100. The larger the numeric value is, the better the tire is.

<Bead Durability 1 (General Bead Durability)>

A drum testing machine is used, and a running time until damage is generated in the bead portion under the following condition is measured.

Rim: 7.50×22.5

Internal pressure: 700 kPa

Vertical load: 27.25 kN×3

Speed: 30 km/h

An evaluation is indicated by an index obtained by setting a running time in the conventional example to 100. The larger the numeric value is, the more excellent the durability is.

<Bead Durability 2 (Heat Bead Durability)>

The general bead durability test mentioned above is executed under a state of heating the rim at 130° C., and a running time until damage is generated in the bead portion is measured. An evaluation is indicated by an index obtained by setting the conventional example to 100. The larger the numeric value is, the better the durability is.

Results of tests and the like are shown in Tables 1 and 2.

TABLE 1

| Structural view | Embodiment 1 FIG. 2 | Embodiment 2 FIG. 2 | Embodiment 3 FIG. 2 | Embodiment 4 FIG. 2 | Embodiment 5 FIG. 2 | Embodiment 6 FIG. 2 | Conventional Example FIG. 11 | Comparative Embodiment 1 FIG. 2 | Comparative Embodiment 2 FIG. 2 | Comparative Embodiment 3 FIG. 2 | Comparative Embodiment 4 FIG. 2 |
|---|---|---|---|---|---|---|---|---|---|---|---|
| * Height La (mm) | 7 | 7 | 7 | 7 | 7 | 7 | — | 7 | 7 | 7 | 7 |
| * Gap Lb (mm) | 3 | 3 | 3 | 3 | 3 | 3 | — | 3 | 3 | 3 | 3 |
| Complex modulus E*a (MPa) of packing rubber Bead | 10 | 10 | 10 | 10 | 10 | 10 | — | 10 | 10 | 10 | 10 |

TABLE 1-continued

| Structural view | Embodiment 1 FIG. 2 | Embodiment 2 FIG. 2 | Embodiment 3 FIG. 2 | Embodiment 4 FIG. 2 | Embodiment 5 FIG. 2 | Embodiment 6 FIG. 2 | Conventional Example FIG. 11 | Comparative Embodiment 1 FIG. 2 | Comparative Embodiment 2 FIG. 2 | Comparative Embodiment 3 FIG. 2 | Comparative Embodiment 4 FIG. 2 |
|---|---|---|---|---|---|---|---|---|---|---|---|
| reinforcing layer | | | | | | | | | | | |
| * Height Hc (mm) | 27 | 27 | 27 | 27 | 27 | 38 | 27 | 27 | 27 | 27 | 45 |
| * Height Hb (mm) | 27 | 27 | 27 | 30 | 38 | 38 | 27 | 27 | 45 | 20 | 45 |
| Rubber thickness t (mm) | 1.5 | 0.9 | 1.9 | 1.5 | 1.5 | 1.5 | 0.6 | 0.4 | 1.5 | 1.5 | 1.5 |
| Bead strength (index) | 125 | 125 | 120 | 130 | 120 | 120 | 100 | 120 | 120 | 110 | 120 |
| General bead durability (index) | 150 | 150 | 140 | 160 | 130 | 140 | 100 | 130 | 90 | 97 | 120 |
| Heat bead durability (index) | 150 | 120 | 140 | 150 | 110 | 140 | 100 | 90 | 110 | 95 | 90 |

TABLE 2

| | Embodiment 1 | Embodiment 2 | Conventional Example |
|---|---|---|---|
| Complex elastic modulus E*a (MPa) of packing rubber | 9.0 | 9.0 | 9.0 |
| With or without bead reinforcing layer | With | With | With |
| Standard internal pressure state | | | |
| Angle θ (degree) | 40 | — | — |
| Distance Lp (mm) | −9 | — | 18 |
| Distance Li (mm) | 3 | — | 30 |
| Distance Lo (mm) | 10 | — | 10 |
| Regular load applied state | | | |
| Angle θ (degree) | — | 40 | — |
| Distance Lp (mm) | — | −16 | 14 |
| Distance Li (mm) | — | −5 | 20 |
| Distance Lo (mm) | — | 3 | 9 |
| General bead durability | 120 | 120 | 100 |
| Heat bead durability | 110 | 110 | 100 |

*Distances Lp, Li and Lo are displayed by setting an inner side in a radial direction from a reference line X to minus (−) and an outer side to plus (+)

It is confirmed that the tire in accordance with the embodiment is improved in both of the general bead durability and the heat bead durability.

The invention claimed is:

1. A heavy duty tire comprising
a carcass comprising a carcass ply of cords extending between bead portions and turned up around a bead core in each bead portion from the inside to outside of the tire so as to form a pair of turnup portions and a main portion therebetween, and
a bead reinforcing layer comprising at least one reinforcing ply of cords disposed in each said bead portion, wherein the turnup portion comprises
a turnup main part extending within an inner region inside a extension line obtained by extending a radially outer surface of the bead core, and
a turnup sub part extending within an outer region outside said extension line through a portion near the radially outer surface of said bead core, and
wherein the reinforcing ply comprises
a center portion extending along the radially inside surface of the turnup main part,
an axially outside portion extending from the center portion to the radially outside of the tire apart from said turnup portion, and
an axially inside portion extending from the center portion to the radially outside of the tire through the inside of said main portion, and wherein
in a state of standard internal pressure when the tire is mounted on a standard rim and inflated by a standard pressure but loaded with no tire load,
the outer end of the turnup sub part is positioned at an inner side of a reference line intersecting vertically with said main portion through a point at which the outer surface of said bead portion is apart from the flange of the standard rim, and
the shortest distance (Lp) between the outer end of the turnup sub part and the reference line is 2 to 12 mm.

2. A heavy duty tire according to claim 1, wherein in a state of 5% internal pressure when the tire is mounted on a standard rim and inflated by 5% of a standard pressure but loaded with no tire load, the distance (La) between an outer end of the turnup sub part and the radially outer surface of said bead core is not more than 15 mm.

3. A heavy duty tire according to claim 1, wherein in a state of 5% internal pressure when the tire is mounted on a standard rim and inflated by 5% of a standard pressure but loaded with no tire load, the angle (θ) between said turnup sub part and said radially outer surface of said bead core is not more than 75 degrees.

4. A heavy duty tire according to claims 1 to 3, wherein in a state of 5% internal pressure when the tire is mounted on a standard rim and inflated by 5% of a standard pressure but loaded with no tire load, the gap (Lb) between an outer end of said turnup sub part and said main portion is 1 to 10 mm.

5. A heavy duty tire according to claims 1 to 3, wherein in a state of 5% internal pressure when the tire is mounted on a standard rim and inflated by 5% of a standard pressure but loaded with no tire load, the rubber thickness (t) between said bead core and the carcass cord is between 0.5 to 3.0 mm, at the innermost position in the tire axial direction of said bead core.

6. A heavy duty tire according to claims 1 to 3, wherein in a state of 5% internal pressure when the tire is mounted on a standard rim and inflated by 5% of a standard pressure but loaded with no tire load, the height (Hb) from the bead base line to the outer end of the inside portion is more than 20 mm and not more than 40 mm, the height (Hc) from the bead base line to the outer end of the outside portion is more than 20 mm and not more than 40 mm, and the height (Hc) is more than the height (Hb).

7. A heavy duty tire according to claims 1 to 3, wherein the packing rubber having a complex modulus (Ea*) of 2 to 25 MPa is arranged in at least a part between said carcass ply and said bead core.

8. A heavy duty tire according to claim 7, wherein the complex modulus (Ea*) is more than 3 MPa and not more than 25 MPa, and a sulfur blend amount of the packing rubber is not less than 5 PHR.

9. A heavy duty tire according to claim 1, wherein in a state of standard internal pressure when the tire is mounted on a standard rim and inflated by a standard pressure but loaded with no tire load, the outer end of the outside portion of the reinforcing ply is positioned at an area which is within 5 mm inward from a reference line intersecting vertically with the main portion through a point at which the outer surface of the bead portion is apart from the flange of the standard rim, and within 20 mm outward therefrom.

10. A heavy duty tire according to claim 1, wherein in a state of standard internal pressure when the tire is mounted on a standard rim and inflated by a standard pressure but loaded with no tire load, the outer end of the inside portion of the reinforcing ply is positioned at an area which is within 30 mm outward from a reference line intersecting vertically with the main portion through a point at which the outer surface of the bead portion is apart from the flange of the standard rim.

11. A heavy duty tire according to claim 1, wherein in a standard load applying state when the tire is mounted on a standard rim and inflated by a standard pressure and loaded with a standard load, the angle (θ) between the turnup sub part and the radially outer surface of the bead core is less than 90 degrees.

12. A heavy duty tire according to claim 1, wherein in a standard load applying state when the tire is mounted on a standard rim and inflated by a standard pressure and loaded with a standard load, the outer end of the outside portion of the reinforcing ply is positioned at an area within 10 mm inward from a reference line intersecting vertically with said main portion through a point at which the outer surface of said bead portion is apart from the flange of the standard rim, and within 15 mm outward therefrom.

13. A heavy duty tire according to claim 1, wherein in a standard load applying state when the tire is mounted on a standard rim and inflated by a standard pressure and loaded with a standard load, the outer end of the inside portion of said reinforcing ply is positioned at an area within 10 mm inward from a reference line intersecting vertically with the main portion through a point at which the outer surface of the bead portion is apart from the flange of the standard rim, and within 20 mm outward therefrom.

14. A heavy duty tire comprising a carcass comprising a carcass ply of cords extending between bead portions and turned up around a bead core in each bead portion from the inside to outside of the tire so as to form a pair of turnup portions and a main portion therebetween, and a bead reinforcing layer comprising at least one reinforcing ply of cords disposed in each said bead portion, wherein the turnup portion comprises a turnup main part extending within an inner region inside a extension line obtained by extending a radially outer surface of the bead core, and a turnup sub part extending within an outer region outside said extension line through a portion near the radially outer surface of said bead core, and wherein the reinforcing ply comprises a center portion extending along the radially inside surface of the turnup main part, an axially outside portion extending from the center portion to the radially outside of the tire apart from said turnup portion, and an axially inside portion extending from the center portion to the radially outside of the tire through the inside of said main portion, wherein in a standard load applying state when the tire is mounted on a standard rim and inflated by a standard pressure and loaded with a standard load, the outer end of the turnup sub part is positioned inside a reference line intersecting vertically with the main portion through a point at which the outer surface of the bead portion is apart from the flange of the standard rim, and wherein the shortest distance (Lp) between the outer end of the turnup sub part and the reference line is 10 to 25 mm.

* * * * *